(12) United States Patent
Sparrer et al.

(10) Patent No.: US 10,871,102 B2
(45) Date of Patent: Dec. 22, 2020

(54) TURBINE FOR AN EXHAUST TURBOCHARGER HAVING A TWO-CHANNEL TURBINE HOUSING AND A VALVE FOR CHANNEL CONNECTION

(71) Applicant: CONTINENTAL AUTOMOTIVE GMBH, Hannover (DE)

(72) Inventors: Christoph Sparrer, Regensburg (DE); Jaroslaw Sebastian Kedzierski, Gruestadt (DE)

(73) Assignee: Continental Automotive GmbH, Hannover (DE)

( * ) Notice: Subject to any disclaimer, the term of this patent is extended or adjusted under 35 U.S.C. 154(b) by 218 days.

(21) Appl. No.: 16/300,984

(22) PCT Filed: Mar. 27, 2017

(86) PCT No.: PCT/EP2017/057167
§ 371 (c)(1),
(2) Date: Nov. 13, 2018

(87) PCT Pub. No.: WO2017/194244
PCT Pub. Date: Nov. 16, 2017

(65) Prior Publication Data
US 2020/0318530 A1    Oct. 8, 2020

(30) Foreign Application Priority Data

May 12, 2016   (DE) ........................ 10 2016 208 159

(51) Int. Cl.
*F02B 37/02*   (2006.01)
*F02B 37/18*   (2006.01)

(52) U.S. Cl.
CPC .......... *F02B 37/025* (2013.01); *F02B 37/183* (2013.01)

(58) Field of Classification Search
CPC ...... F02B 37/025; F02B 37/18; F02B 37/183; F02B 37/186; F02B 37/22; F01D 17/143; F01D 17/146; F01D 9/026
See application file for complete search history.

(56) References Cited

U.S. PATENT DOCUMENTS 6,250,079 B1   6/2001   Zander et al.
8,109,257 B2   2/2012   An et al.
(Continued)

FOREIGN PATENT DOCUMENTS

CN   102472160 A      5/2012
DE   102006009298 A1  9/2007
(Continued)

*Primary Examiner* — Jesse S Bogue
*Assistant Examiner* — Loren C Edwards
(74) *Attorney, Agent, or Firm* — Laurence A. Greenberg; Werner H. Sterner; Ralph E. Locher

(57) ABSTRACT

A turbine for an exhaust-gas turbocharger has a turbine housing formed with two exhaust-gas volutes through which an exhaust gas can flow. A separating wall is provided between the exhaust-gas volutes. The exhaust-gas volutes have a wastegate opening which is closable by a wastegate valve. A further valve element provided for controlling the volute connection has a displacement shaft and a closing body. The displacement shaft is guided through a bore that is formed in the separating wall between the two volutes, and the closing body is arranged in a volute connection, formed as a passage recess, of the separating wall in order to open and close the volute connection.

9 Claims, 8 Drawing Sheets

(56) References Cited

U.S. PATENT DOCUMENTS

| | | | |
|---|---|---|---|
| 8,733,101 B2 | 5/2014 | Hoshi et al. |
| 10,619,507 B2 | 4/2020 | Bochskanl et al. |
| 2009/0028694 A1 | 1/2009 | Naemura et al. |
| 2009/0120087 A1 | 5/2009 | Sumser et al. |
| 2010/0024414 A1 | 2/2010 | Hittle et al. |
| 2017/0350312 A1 | 12/2017 | Karstadt et al. |

FOREIGN PATENT DOCUMENTS

| | | |
|---|---|---|
| DE | 102006019780 A1 | 11/2007 |
| DE | 102010008411 A1 | 8/2011 |
| DE | 102013002894 A1 | 9/2014 |
| DE | 202014009873 U1 | 4/2016 |
| DE | 102016200812 A1 | 7/2017 |
| GB | 2038940 A | 7/1980 |
| JP | 2009092026 A | 4/2009 |
| WO | 2007060831 A1 | 5/2007 |

Detail A

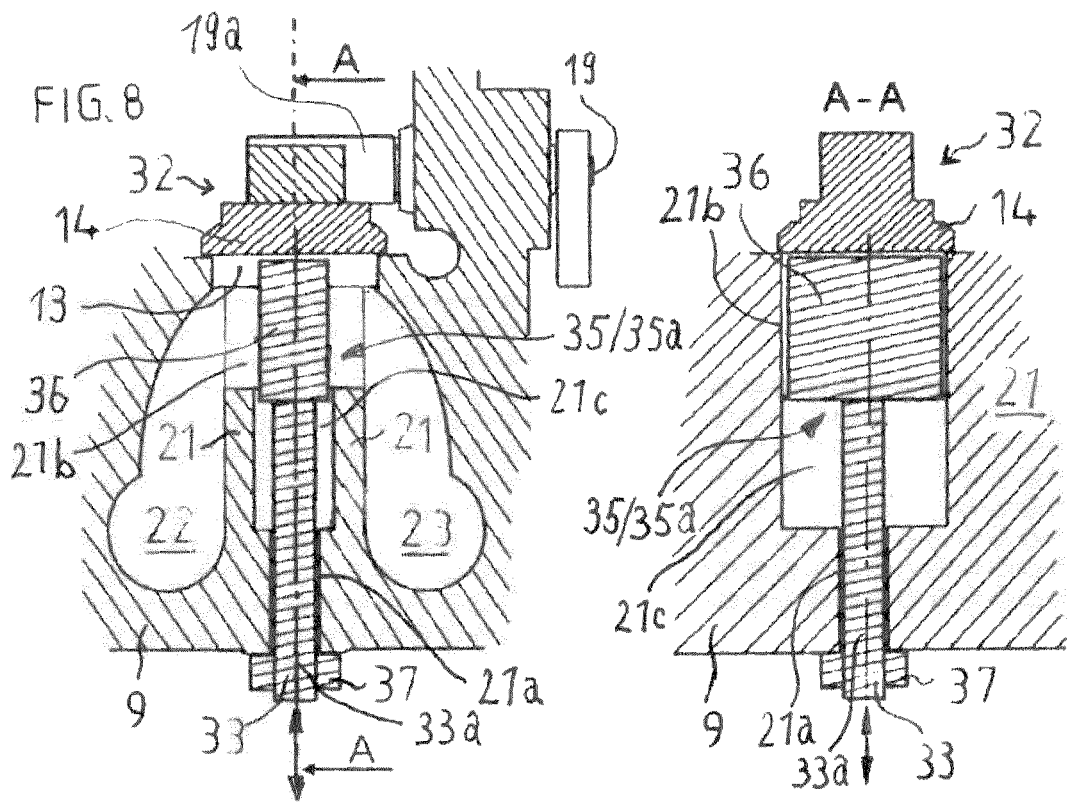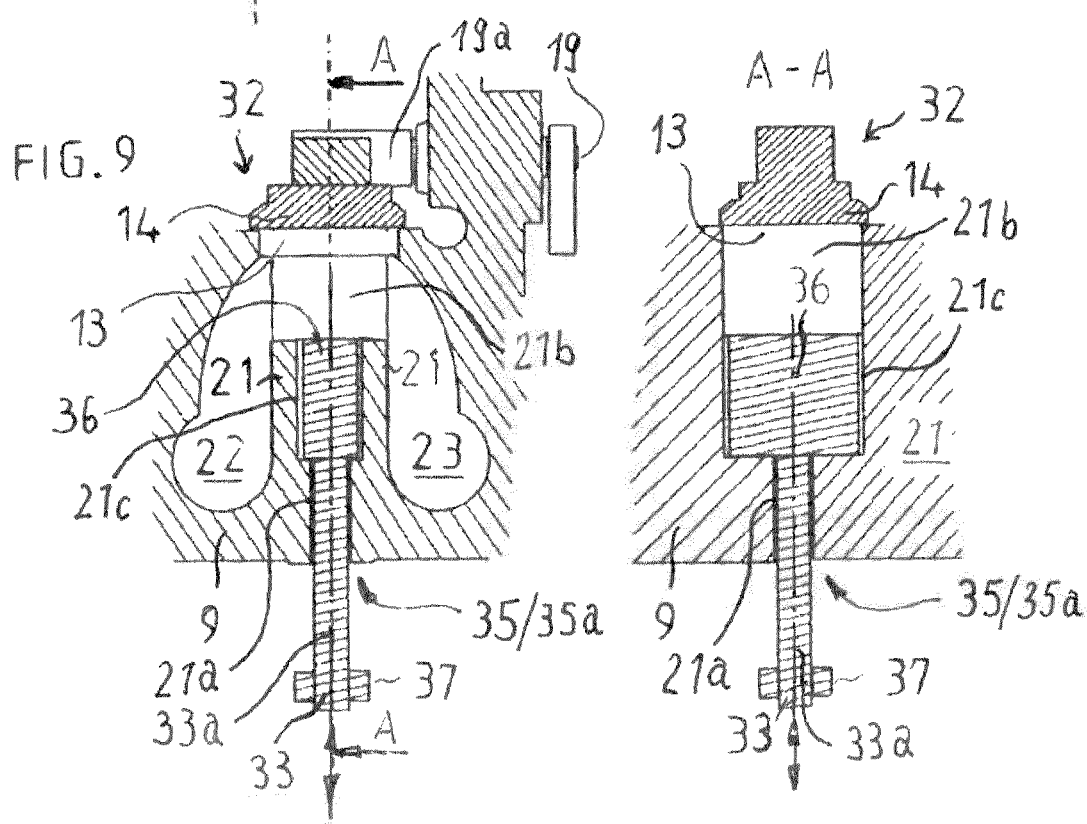

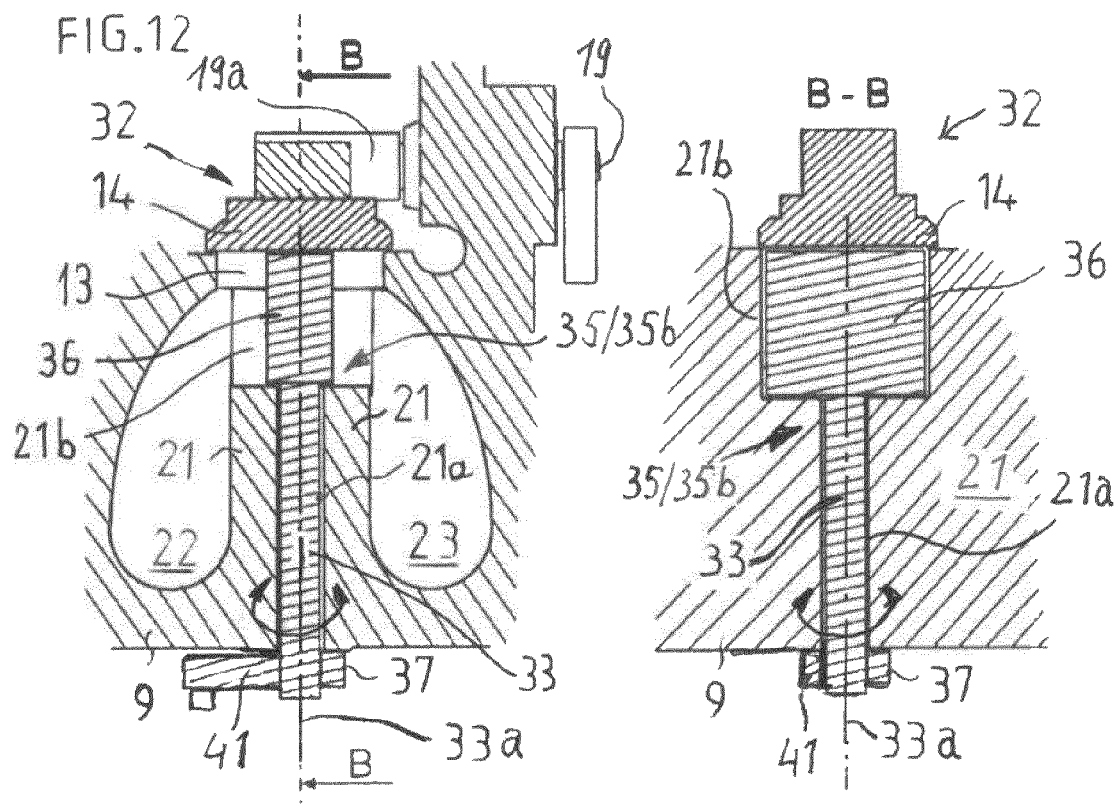
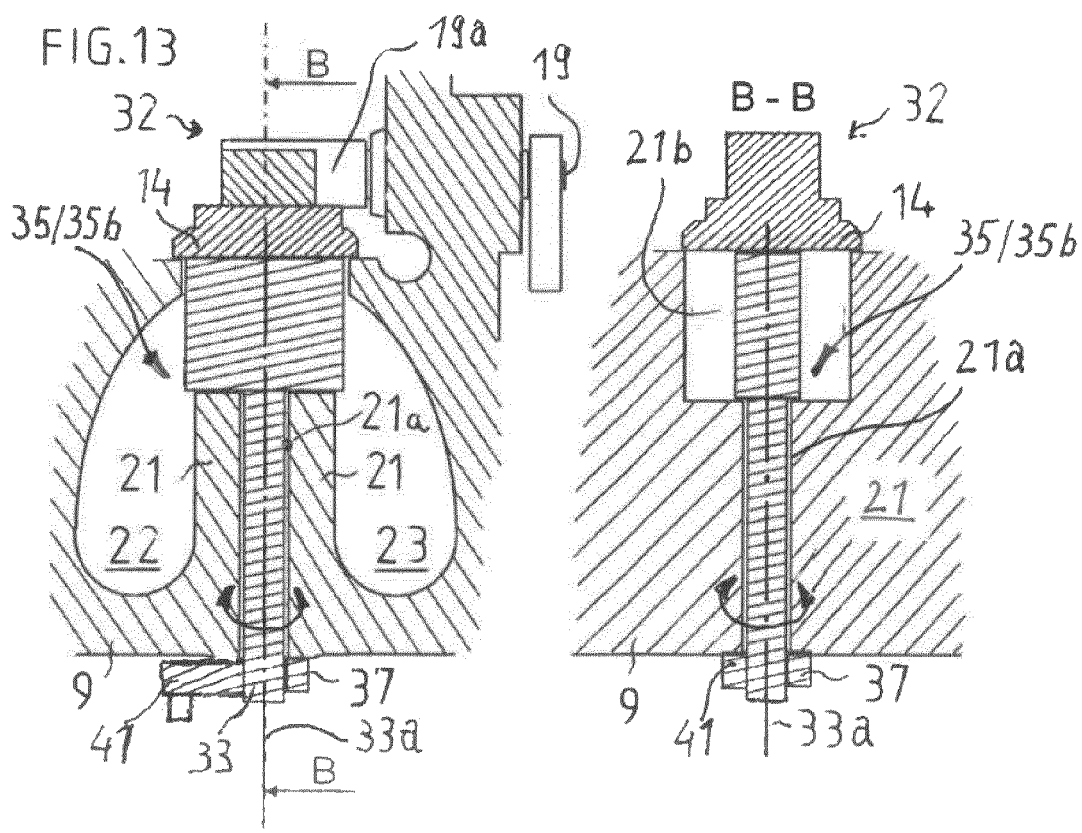

TURBINE FOR AN EXHAUST TURBOCHARGER HAVING A TWO-CHANNEL TURBINE HOUSING AND A VALVE FOR CHANNEL CONNECTION

BACKGROUND OF THE INVENTION

Field of the Invention

The invention relates to a turbine for an exhaust-gas turbocharger with a two-volute turbine housing and with a valve for volute connection.

An internal combustion engine 1 which is supercharged by an exhaust-gas turbocharger 2 is characterized by the arrangement of the guidance of fresh air and exhaust gases as illustrated in FIG. 1. During supercharged operation, the exhaust gas flows from the internal combustion engine 1 via the turbine 3, which drives the compressor 4 in the intake tract upstream of the inlet of the engine 1 via a common shaft 5. As a result of the compression of the intake air, more fuel can be admixed per cylinder stroke, and the torque of the engine 1 is increased.

For the sake of clarity, some elements of the air-guiding arrangement not illustrated in FIG. 1. These are for example an air filter arranged upstream of the compressor 4, an air flow sensor arranged upstream of the compressor 4, a charge-air cooler arranged downstream of the compressor 4, a tank, a crankcase ventilation means arranged downstream of the throttle flap 8, and a catalytic converter arranged downstream of the turbine 3. An exhaust-gas recirculation arrangement that may be provided, or secondary air injection means, have likewise not been illustrated.

During supercharged operation, the throttle flap 8 is fully open. The closed-loop control of the supercharging may be effected for example by virtue of a part of the exhaust-gas mass flow being blown off through a wastegate system 7.

Furthermore, on the compressor side, there is arranged a so-called overrun air recirculation system 6, via which excess compressed intake air can be blown off and recirculated into the intake tract.

FIG. 2 illustrates a possible embodiment of an exhaust-gas turbocharger 2 according to the prior art. This illustration includes a section in the region of the wastegate system. Said wastegate system 7 is arranged in the turbine housing 9. The wastegate system has a flap-pivot arm valve, which is actuated by means of a wastegate actuator 10 which is fastened to the compressor housing 11 using a holder. Between the turbine housing 9 and compressor housing 11, there is situated a bearing assembly 12 in which the common rotor shaft 5 of turbine wheel and compressor wheel is accommodated.

FIG. 3 shows the wastegate system 7 in a plan view and in a sectional illustration of the side view. The illustration shows the wastegate opening 13 in the turbine housing 9, which can be opened up or closed off by means of a flap disk 14. Thus, a part of the exhaust-gas mass flow can be conducted past the turbine wheel as required. The opening and closing actuation of the flap disk 14 is performed by means of a linear movement of a control rod 15 which is driven in a manner controlled by a pneumatic or electric actuator. This linear movement is transmitted via a connecting plate 16 to an outer wastegate lever 17. The wastegate spindle 19 mounted in a bushing 18 transmits the rotational movement to the pivot arm 19a and thus to the flap disk 14. Owing to the linearly guided control rod 15, a compensation joint 20 is additionally required in the kinematic arrangement in order to ensure a compensation of an offset.

The above embodiments relate to exhaust-gas turbochargers with a single-volute turbine housing, which has only one exhaust-gas supply channel, a so-called exhaust-gas volute, which is arranged in spiral fashion around the turbine impeller 9c. Corresponding exhaust-gas turbines are also referred to as monoscroll turbines. This technology has the disadvantage that the charge exchange, that is to say the exchange of exhaust gas and fuel-gas mixture, of the individual cylinders of the internal combustion engine during operation can have a mutually adverse effect owing to the pulsating exhaust-gas back pressure. This has an adverse effect on the charging of the cylinders of the engine with fuel-gas mixture, whereby, in turn, the consumption, response behavior and nominal power thereof are impaired.

To eliminate or at least alleviate this problem, use may be made of two-volute or multi-volute turbine housings which correspondingly have two or more mutually separate exhaust-gas volutes. Here, a distinction is made between segmented-scroll turbine housings 9a and twin-scroll turbine housings 9b, as illustrated in FIG. 4.

Both turbines comprise a separating wall 21, which is provided between the two exhaust-gas volutes 22 and 23. In the case of the segmented-scroll turbine housing 9a, the separating wall 21 is arranged such that the turbine impeller 9c is impinged on from both exhaust-gas volutes 22, 23 over in each case 180° over the full impeller inlet width. In the case of the twin-scroll turbine housing 9b, the separating wall 21 is arranged in the radial direction with respect to the turbine impeller 9c, whereby said turbine impeller is impinged on from both exhaust-gas volutes over 360° over a fraction, for example in each case 50%, of the impeller inlet width. In both turbine construction types, use is made, as can be seen from FIG. 5, of an exhaust-gas manifold 24 in which, in the case of four-cylinder engines, in each case two cylinders, and in the case of six-cylinder engines, in each case three cylinders, are combined to form a tract. Each tract is in turn connected to one exhaust-gas volute of the two-volute turbine housing. It is ensured in this way that the pulsating exhaust-gas mass flows of the individual cylinders have the least possible adverse effect on one another.

FIG. 5 illustrates the exhaust-gas manifold of a four-cylinder engine, in the case of which in each case two exhaust-gas lines of the respective cylinders are combined to form a tract. Thus, the exhaust-gas lines 26 and 29 of the first and of the fourth cylinder are combined to form a tract. Furthermore, the exhaust-gas lines 27 and 28 of the second and of the third cylinder are combined to form a tract. The arrows shown are intended to illustrate the respective mutually separate exhaust-gas mass flows 25.

As in the case of monoscroll turbines, closed-loop charge-pressure control is realized in the case of exhaust-gas turbochargers with two-volute turbine housings by virtue of excess exhaust gases being blown off via a wastegate system. For a further reduction of the charge-exchange losses in the case of exhaust-gas turbochargers with two-volute turbine housings, a volute connection between the separated exhaust-gas volutes which is openable and closable in accordance with demand has proven to be advantageous. As in the case of the wastegate system, this involves a valve arrangement which permits a transfer flow of exhaust gas between the exhaust-gas volutes as required.

DE 10 2013 002 894 A1 has disclosed a turbine for an exhaust-gas turbocharger, which turbine has a turbine housing in which two exhaust-gas volutes through which exhaust gas can flow are provided, which turbine housing furthermore has a bypass channel. Furthermore, a valve arrangement is provided which, in the closed state, shuts off both the volute connection and the bypass channel and, in the open state, opens both the volute connection and the bypass channel. Said valve arrangement is designed as a flap-pivot arm valve. It has a pivot arm which is pivotable about a center of rotation and to the end region of which there is fastened a flap disk, which is supplemented by a spherical-segment-shaped valve body which projects into the valve opening.

The use of such a rotationally pivotable flap-pivot arm valve, which simultaneously acts as a valve element for actuating the wastegate valve and the volute connection, has disadvantages. For example, there is limited freedom with regard to the design of the valve body. This will be discussed on the basis of FIGS. 6 and 7, which illustrate the movement of a valve body that projects into the valve opening. From these figures, it is clear that the movement of the valve body is limited by a circle (illustrated by dashed lines). Consequently, the outer contour of the valve body must be selected such that the valve body, during this movement, does not cross the circular line toward the outside. This has the disadvantage, for example, that the shape of the valve body cannot be freely selected.

Furthermore, DE 10 2010 008 411 A1 has disclosed an exhaust-gas turbine for an exhaust-gas turbocharger, which exhaust-gas turbine has a turbine housing which has two exhaust-gas volutes, through which exhaust gas can flow, and has a bypass. Between the exhaust-gas volutes and the bypass, there is provided a translationally displaceable valve arrangement which, as a valve element, has a valve shank, a valve disk and a pot-shaped cover. The valve disk and valve shank together with the wastegate opening form the wastegate valve in the manner of a flap-shaft valve. The additional pot-shaped cover, in a certain valve position, produces the volute connection. In a first position of this valve element, the exhaust-gas volutes are fluidically separated from one another, and the bypass is closed. In a second position of this valve element, the exhaust-gas volutes are fluidically connected to one another, and the bypass is closed. In a third position of this valve element, the exhaust-gas volutes are fluidically connected to one another, and the bypass is additionally open.

SUMMARY OF THE INVENTION

It is the object of the invention to specify a turbine for an exhaust-gas turbocharger having a two-volute turbine housing, in the case of which the control of the volute connection is improved.

This object is achieved by means of a turbine having the features as claimed. Advantageous embodiments and refinements of the invention are specified in the dependent claims.

A turbine according to the invention for an exhaust-gas turbocharger has a turbine housing which has two exhaust-gas volutes through which an exhaust gas can flow and between which a separating wall 21 is provided, wherein the exhaust-gas volutes have a common wastegate opening which is closable and openable by a valve disk of a wastegate valve and by means of which they are fluidically connected. Furthermore, the turbine according to the invention is characterized in that it has a further valve element which is provided for controlling a volute connection between the two exhaust-gas volutes and which has a displacement shaft and a closing body connected to the displacement shaft. Here, the displacement shaft is guided through a bore, which runs in the separating wall plane of the separating wall, between the two volutes, and the closing body is arranged in a volute connection, formed as a passage recess, of the separating wall in order to open and close the volute connection. The passage recess is arranged in the separating wall in the region of the wastegate opening so as to run transversely with respect to the separating wall plane.

Here, it is self-evident that the closing body of the valve element is designed such that, in the closed state of the volute connection, it closes off the passage recess in the separating wall completely and in as sealed a manner as possible, and in the open state of the volute connection, it opens up at least a part of the passage recess and thus permits a transfer flow of an exhaust-gas mass flow from one volute to the other.

The advantages of a turbine having the features as claimed consist in particular in that, during the operation of the turbine, owing to the guidance of the displacement arm of the additional valve in the separating wall between the two volutes, exact guidance of the displacement arm is ensured. A further advantage of the invention consists in a reduced space requirement, because guidance of the displacement arm is possible at least partially within the separating wall, which is provided in any case in two-volute turbines, of the turbine housing. Furthermore, the invention makes it possible for the control of the volute connection to be performed independently of the control of the wastegate valve with good open-loop or closed-loop controllability. Further advantages of a turbine as claimed will emerge from the following description of exemplary embodiments of the invention on the basis of FIGS. 8 to 15.

BRIEF DESCRIPTION OF THE SEVERAL VIEWS OF THE DRAWING

FIG. 8 shows sectional illustrations for illustrating a first exemplary embodiment of the invention in the case of a closed wastegate valve and closed volute connection, FIG. 9 shows sectional illustrations for illustrating the first exemplary embodiment of the invention in the case of a closed wastegate valve and open volute connection, FIG. 12 shows sectional illustrations for illustrating a second exemplary embodiment of the invention in the case of a closed wastegate valve and closed volute connection, FIG. 13 shows sectional illustrations for illustrating the second exemplary embodiment of the invention in the case of a closed wastegate valve and open volute connection.

DESCRIPTION OF THE INVENTION

Figure 1:
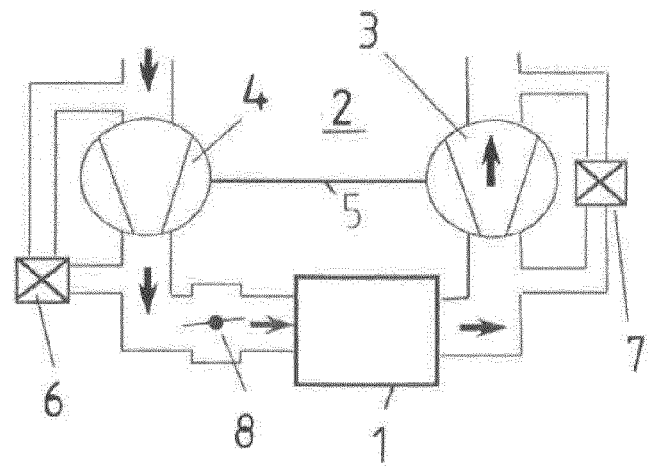
FIG. 1 shows a schematic diagram of an internal combustion engine with an exhaust turbine arrangement.
Figure 2:
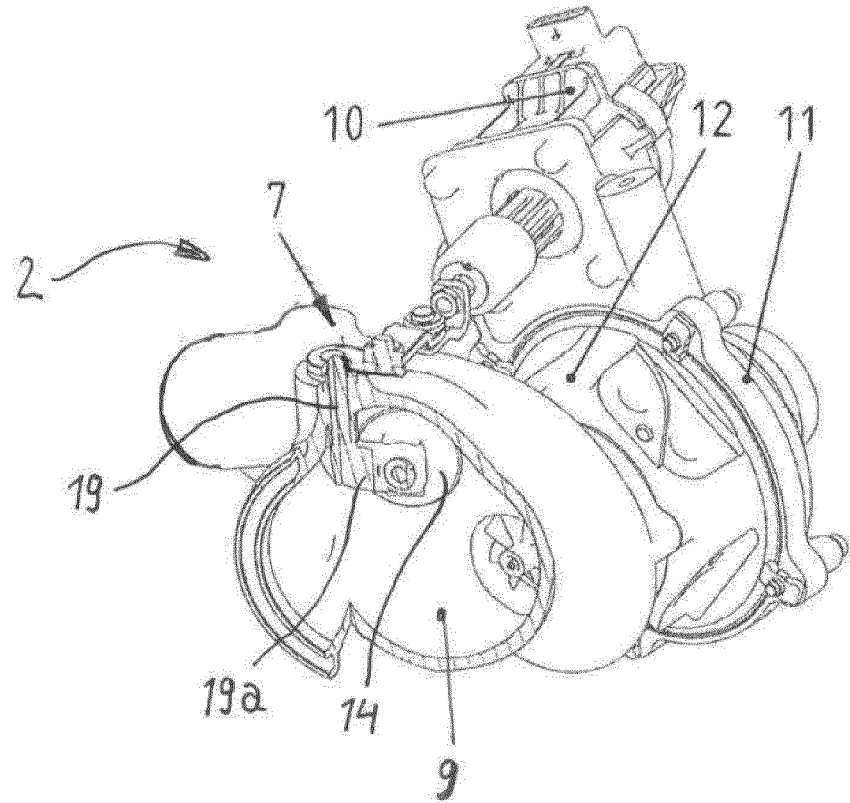
FIGS. 2-7 show details of the exhaust turbine.
Figure 3:
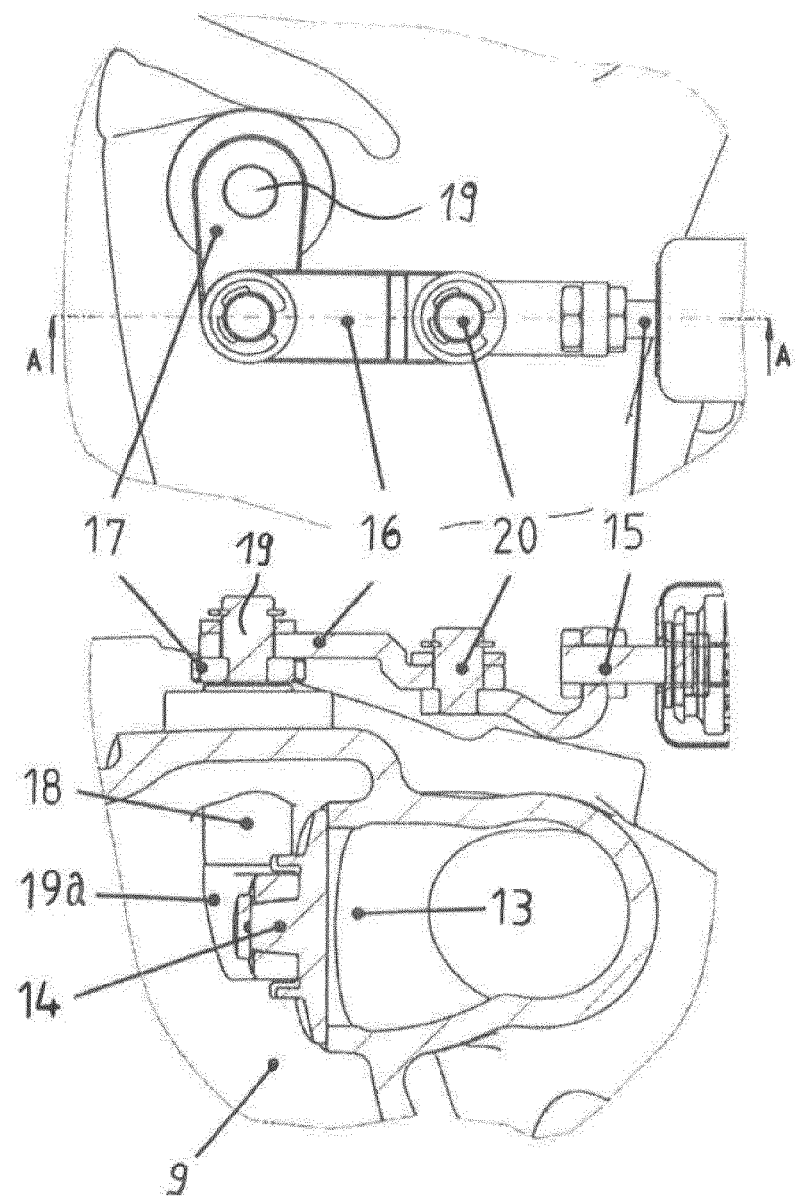
Figure 4:
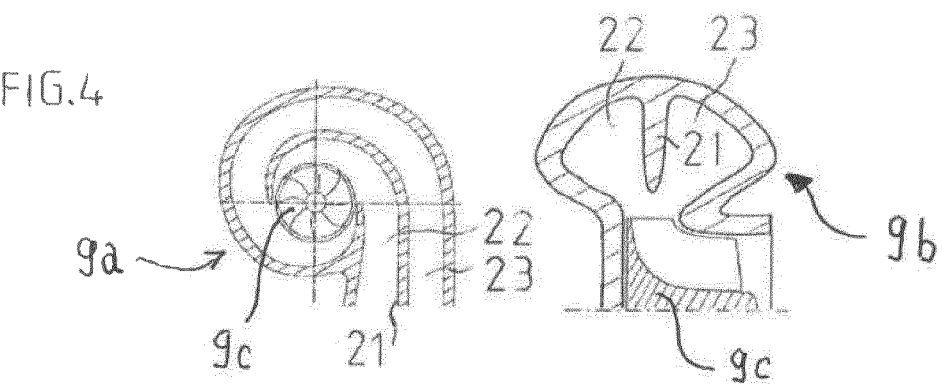
Figure 5:
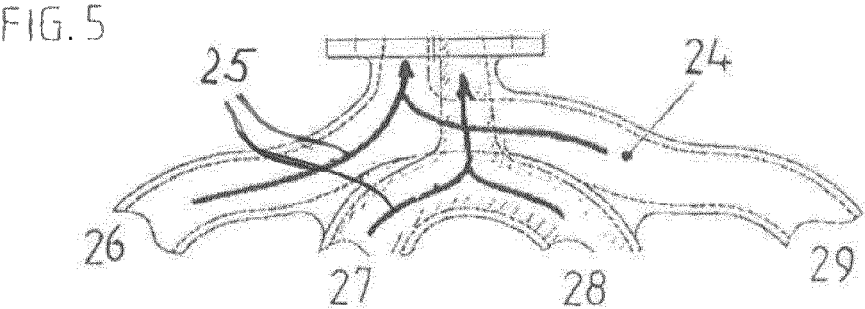
Figure 6:
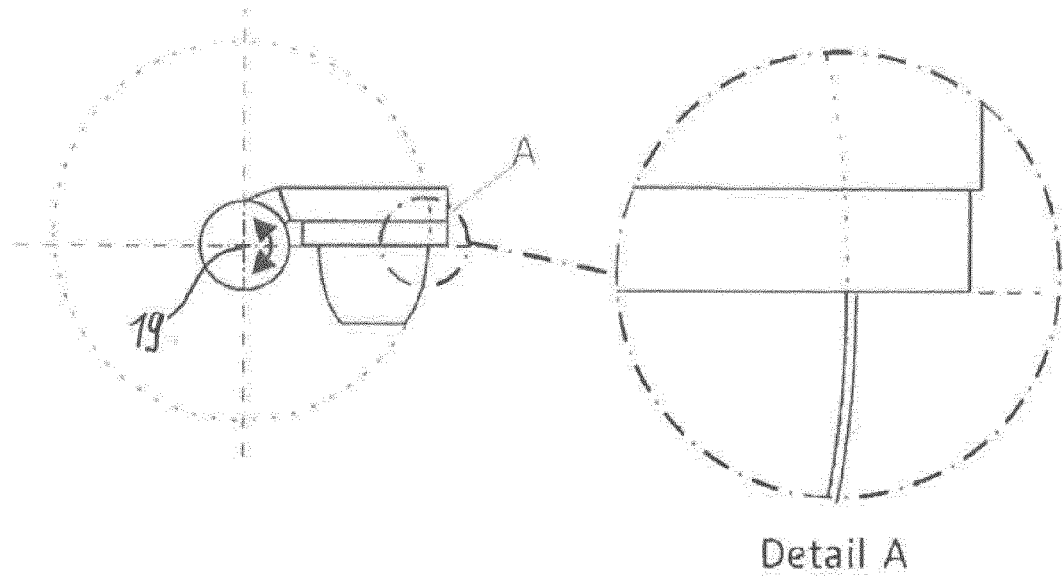
Figure 7:
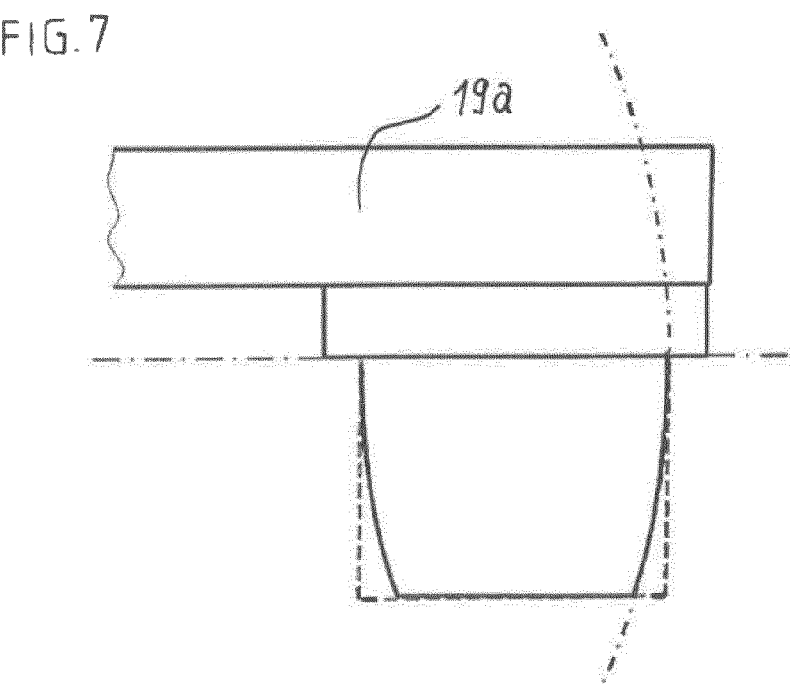

Components of identical function and designation are denoted by the same reference designations throughout the figures. The illustrated subjects are to be understood as examples of various embodiments or refinements thereof, and are not intended to rule out further alternative designs in accordance with the definition of the claims.

FIG. 8 shows sectional illustrations for illustrating a first exemplary embodiment of the invention in the case of a closed volute connection. Here, a sectional illustration of the valve arrangement perpendicular to the profile of the exhaust-gas volutes 22, 23 and the separating wall plane of the separating wall 21 is shown on the left-hand side. A sectional illustration along the section line A-A indicated in the left-hand sectional illustration in FIG. 8 is shown on the right-hand side of FIG. 8, that is to say a section in the direction of the profile of the exhaust-gas volutes in the separating wall plane of the separating wall 21. Here, the valve arrangement is illustrated in the closed state of the wastegate valve and of the volute connection.

In this first exemplary embodiment, two exhaust-gas volutes 22 and 23 through which an exhaust gas can flow are provided in the turbine housing 9. Between these two exhaust-gas volutes 22, 23, there is situated a separating wall 21, in which there is provided a bore 21a which runs centrally in the separating wall plane of the separating wall 21. Furthermore, a wastegate opening 13 is provided which is fluidically connected to both exhaust-gas volutes 22, 23. In the exemplary embodiment shown, the wastegate opening 13 is closed off by a flap disk 14 of a wastegate valve 32, wherein the flap disk 14 of the wastegate valve 32 is, in the manner of a flap-pivot arm valve, pivotable by means of a pivot arm 19a with a wastegate spindle 19 into an open or a closed position. Alternatively, the flap disk 14 of the wastegate valve 32 may also, in the manner of a flap-shaft valve (not illustrated), be displaced by means of a valve shaft into an open or a closed position.

Furthermore, in the exemplary embodiment shown, a further valve element 35 is provided, which is provided for controlling a volute connection between the two exhaust-gas volutes 22, 23 and which is designed as a linear slide 35a which has a displacement shaft 33 and a closing body 36 connected to the displacement shaft 33. The closing body 36 and the displacement shaft 33 may be mechanically fixedly connected or formed in one piece.

Here, the closing body 36 is arranged in a volute connection, formed as a passage recess 21b, of the separating wall 21 in order to open and close the volute connection, wherein the passage recess 21b is arranged in the separating wall 21 in the region of the wastegate opening 13 so as to run transversely with respect to the separating wall plane.

The displacement shaft 33 is guided through the bore 21a of the separating wall 21 of the turbine housing 9 and is movable within said bore 21a in its axial direction, that is to say in the direction of the displacement shaft longitudinal axis 33a, indicated in FIG. 8 by means of a double arrow. Thus, the closing body 36 is displaceable together with the displacement shaft 33 in the axial direction of the displacement shaft in order to open and close the volute connection of the separating wall 21.

Furthermore, the separating wall 21 has, in the region of the passage recess 21b, a groove-like or pocket-like closing body recess 21c which runs in the direction of the displacement shaft 33, downward in the drawing, and into which the closing body 36 can be retracted in an axial direction in order to open the volute connection.

FIG. 8 illustrates the linear slide 35a in its closed position, that is to say when the volute connection is closed, whereby the two exhaust-gas volutes 22 and 23 are fluidically separated from one another by the separating wall 21 and the closing body 36. At the same time, the wastegate opening 13 is also illustrated in a closed state.

In the illustration shown, the displacement shaft 33 has, in its end region averted from the closing body 36, a stop element 37 which limits the axial movement of the linear slide 35a during the closing of the volute connection, such that, in the illustrated closed position of the linear slide 35a, said stop element forms a stop for the movement of the displacement shaft 33.

From FIG. 8, it can furthermore be seen that, when the wastegate valve 32 is fully closed and the volute connection is fully closed, that end region of the closing body 36 which is averted from the displacement shaft 33 bears sealingly against the flap disk 14 of the wastegate valve 32, or is spaced apart from the latter by a gap defined by the stop element 37, which gap preferably lies in the region of 0.2 mm.

If the displacement shaft 33 is retracted by means of an actuator (not illustrated here), downward in FIG. 8, then the closing body 36 that is fixedly connected to the displacement shaft 33 is also retracted downward, such that the closing body 36 is retracted into the pocket-like closing body recess 21c of the separating wall 21, until the volute connection is fully open. In this fully open position of the linear slide 35a illustrated in FIG. 9, the two exhaust-gas volutes 22 and 23 are fluidically connected to one another in the region of the passage recess 21b, such that a transfer flow of an exhaust-gas mass flow from one exhaust-gas volute to the other exhaust-gas volute, and thus a pressure equalization between the two exhaust-gas volutes 22, 23, is made possible. In the illustration of the first exemplary embodiment shown in FIG. 9, the wastegate opening 13 is again closed, but can be pivoted into the open state irrespective of the position of the linear slide 35a, such that an excess exhaust-gas mass flow can be discharged from the exhaust-gas volutes 22, 23 through the wastegate valve 32 and conducted past the turbine wheel.

Consequently, in the exemplary embodiment shown in FIGS. 8 and 9, the fluidic connection of the two exhaust-gas volutes 22, 23 is realized using a linear slide 35a. Here, the displacement shaft 33 of the linear slide 35a is guided, centrally with respect to the wastegate opening 13, through the separating wall 21 between the two exhaust-gas volutes 22 and 23. The bore 21a preferably runs through the separating wall 21 centrally in the separating wall plane of the separating wall 21. This guidance of the displacement shaft 33 in the separating wall 21 ensures reliable guidance of the linear slide 35a and permits substantially play-free setting both of the closed position of the linear slide 35a and a uniform displacement of the linear slide into the open position.

FIG. 9 shows, analogously to FIG. 8, sectional illustrations for illustrating the first exemplary embodiment of the invention, but in the case of an open volute connection.

From the two illustrations in FIG. 9, it is clear that the closing body 36, in its retracted position, is positioned within the valve body recess 21c in the region of the passage recess 21b of the separating wall 21, and that the two exhaust-gas volutes 22 and 23 are, above said retracted closing body 36, fluidically connected to one another in the region of the passage recess 21b of the separating wall 21. It can also be seen from FIG. 9 that, as before, the flap disk 14 of the wastegate valve 32 closes off the wastegate opening 13 of the turbine housing 9, such that the wastegate valve 32 is, as before, in its closed state.

The open states of the valve element 35, which controls the volute connection and which is designed as a linear slide 35a, and of the wastegate opening 13 of the wastegate valve 32 can consequently be actuated, in particular varied with open-loop or closed-loop control, independently of one another.

Figure 10:
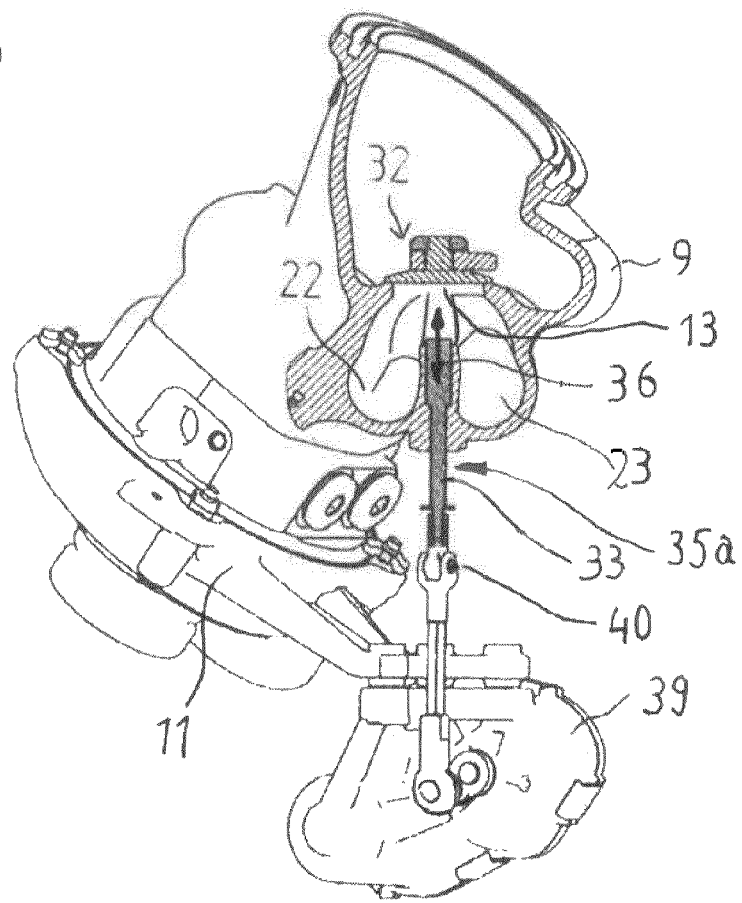
FIG. 10 shows an illustration of a turbocharger with a partial section in the region of the wastegate valve for the purposes of explaining an exemplary embodiment for an arrangement of a valve element, designed as a linear slide, as per FIGS. 8 and 9.

FIG. 10 shows an illustration of a turbocharger with a partial section in the region of the wastegate valve for the purposes of explaining an exemplary embodiment for an arrangement of a valve element, designed as a linear slide, as per FIGS. 8 and 9. This actuation of the linear slide 35a may be performed for example using a rotational actuator 39 fastened to the compressor housing 11, which rotational actuator is connected via a compensation joint 40 to the displacement shaft 33 and is provided for the axial displacement of the latter. By means of this axial displacement of the displacement shaft 33, it is also the case, as has already been discussed above, that the volute connection between the exhaust-gas volutes 22, 23 is opened and closed in the region of the wastegate opening 13 of the wastegate valve 32 by means of the closing body 36, which is connected to or formed integrally with the displacement shaft 33, within the turbine housing 9.

Figure 11:
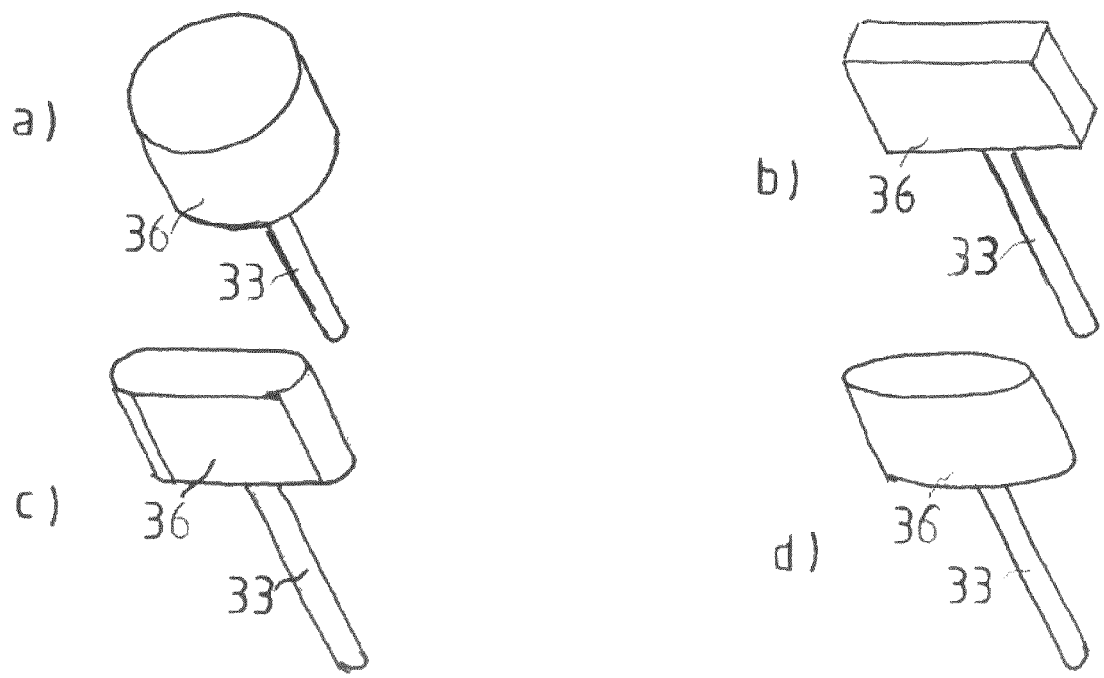
FIG. 11 shows perspective illustrations for illustrating various possible structural forms of the linear slide shown in FIGS. 8 and 9.

FIG. 11 shows simplified perspective illustrations for illustrating various possible structural forms of the linear slide 35a shown in FIGS. 8 and 9. Said linear slides 35a each have a displacement shaft 33 and a closing body 36. FIG. 11a shows a linear slide, the closing body 36 of which is of cylindrical design. FIG. 11b shows a linear slide, the closing body 36 of which is of cuboidal design. FIG. 11c shows a linear slide, the closing body 36 of which is likewise of cuboidal design, but the lateral end regions of which are rounded. FIG. 11d shows a linear slide, the closing body 36 of which has an oval cross-sectional area.

FIG. 12 shows sectional illustrations for illustrating a second exemplary embodiment of the invention in the case of a closed volute connection. Here, a sectional illustration of the valve arrangement perpendicular to the profile of the exhaust-gas volutes 22, 23 and the separating wall plane of the separating wall 21 is shown on the left-hand side. A sectional illustration along the section line B-B indicated in the left-hand sectional illustration in FIG. 12 is shown on the right-hand side of FIG. 12, that is to say a section in the direction of the profile of the exhaust-gas volutes in the separating wall plane of the separating wall 21. Here, the valve arrangement is illustrated in the closed state of the wastegate valve and of the volute connection.

The illustrated exemplary embodiment is characterized in that the further valve element 35 is a rotary flap 35b which has the closing body 36 connected to the displacement shaft 33, wherein the closing body 36 is rotatable together with the displacement shaft 33 about the displacement shaft longitudinal axis 33a thereof in order to open and close the volute connection of the separating wall 21.

In this second exemplary embodiment, too, two exhaust-gas volutes 22 and 23 through which an exhaust gas can flow are provided in the turbine housing 9. Between these two exhaust-gas volutes 22, 23, there is situated a separating wall 21, in which there is provided a bore 21a which runs centrally in the separating wall plane of the separating wall 21. Furthermore, a wastegate opening 13 is provided which is fluidically connected to both exhaust-gas volutes 22, 23. In the exemplary embodiment shown, the wastegate opening 13 is closed off by a flap disk 14 of a wastegate valve 32, wherein the flap disk 14 of the wastegate valve 32 is, in this case too, in the manner of a flap-pivot arm valve, pivotable by means of a pivot arm 19a with a wastegate spindle 19 into an open or a closed position. Alternatively, the flap disk 14 of the wastegate valve 32 may, in this case too, in the manner of a flap-shaft valve (not illustrated), be displaced axially by means of a displacement shaft into an open or a closed position.

Furthermore, in the exemplary embodiment shown, a further valve element 35 is provided, which is provided for controlling a volute connection between the two exhaust-gas volutes 22, 23 and which is designed as a rotary flap 35b which has a displacement shaft 33 and a closing body 36 connected to the displacement shaft 33. The closing body 36 and the displacement shaft 33 may be mechanically fixedly connected or formed in one piece. Here, the closing body 36 is arranged in a volute connection, formed as a passage recess 21b, of the separating wall 21 in order to open and close the volute connection, wherein the passage recess 21b is arranged in the separating wall 21 in the region of the wastegate opening 13 so as to run transversely with respect to the separating wall plane.

The displacement shaft 33 is guided through the bore 21a of the separating wall 21 of the turbine housing 9 and is guided within said bore 21 so as to be rotatable about its displacement shaft longitudinal axis 33a, as indicated in FIG. 12 by means of a double arrow.

FIG. 12 illustrates the rotary flap 35b in its closed position, in which the passage recess 21b of the separating wall 21 is closed by the closing body 36 of the rotary flap 35b. At the same time, the wastegate opening 13 is also closed by the flap disk 14.

It can also be seen from FIG. 12 that, when the wastegate valve 32 is closed, that end region of the closing body 36 of the rotary flap 35b which is averted from the displacement shaft 33 bears against the closed flap disk 14 of the wastegate valve 32, or is spaced apart only by a defined gap, which preferably lies in the region of 0.2 mm, both in the closed and in the open state of the volute connection.

Thus, the two exhaust-gas volutes 22 and 23 are fluidically separated from one another by the separating wall 21 and the closing body 36, while the wastegate valve 32 is simultaneously closed. The displacement shaft 33 has, in its end region averted from the closing body 36, a rotary crank 41 which is provided for the rotational actuation of the rotary flap 35b by an actuator.

FIG. 13 shows, analogously to FIG. 12, sectional illustrations for illustrating the second exemplary embodiment of the invention, but in the case of an open volute connection.

If the displacement shaft 33 is rotated through 90 degrees, for example as illustrated in FIG. 13, by an actuator which is not shown in FIGS. 12 and 13, then the closing body 36 fixedly connected to the displacement shaft 33 is also rotated in the same way, such that the closing body 36 of the rotary flap 35b at least partially opens up the passage recess 21b in the separating wall 21 of the two exhaust-gas volutes 22, 23. Here, as before, the wastegate opening 13 is closed. Thus, only the two exhaust-gas volutes 22, 23 are fluidically connected to one another for the purposes of the pressure equalization, without an exhaust-gas mass flow being able to flow out via the wastegate valve 32. Consequently, exhaust gas can flow over from one of the two volutes into the other volute. Additionally, the wastegate valve 32 can, irrespective of the position of the rotary flap 35b, be placed into the open state, such that an exhaust gas mass flow can also be conducted through the wastegate valve 32 and past the turbine wheel.

Consequently, in the exemplary embodiment shown in FIGS. 12 and 13, the fluidic connection of the two exhaust-gas volutes 22, 23 is produced by rotational displacement of a rotary flap 35b. For this adjustment of the rotary flap 35b, the displacement shaft 33 is displaced in rotation by means of an actuator (not illustrated here). The bore 21a through which the displacement shaft 33 is guided preferably runs centrally through the separating wall 21. This guidance of the displacement shaft 33 in the separating wall 21 ensures reliable guidance of the rotary flap 35b and permits substantially play-free setting both of the closed position, and a uniform opening of the rotary flap 35b.

The open states of the passage recess 21b of the volute connection and of the wastegate opening 13 of the wastegate valve 32 can consequently be actuated, in particular varied with open-loop or closed-loop control, independently of one another in this case too.

Figure 14:
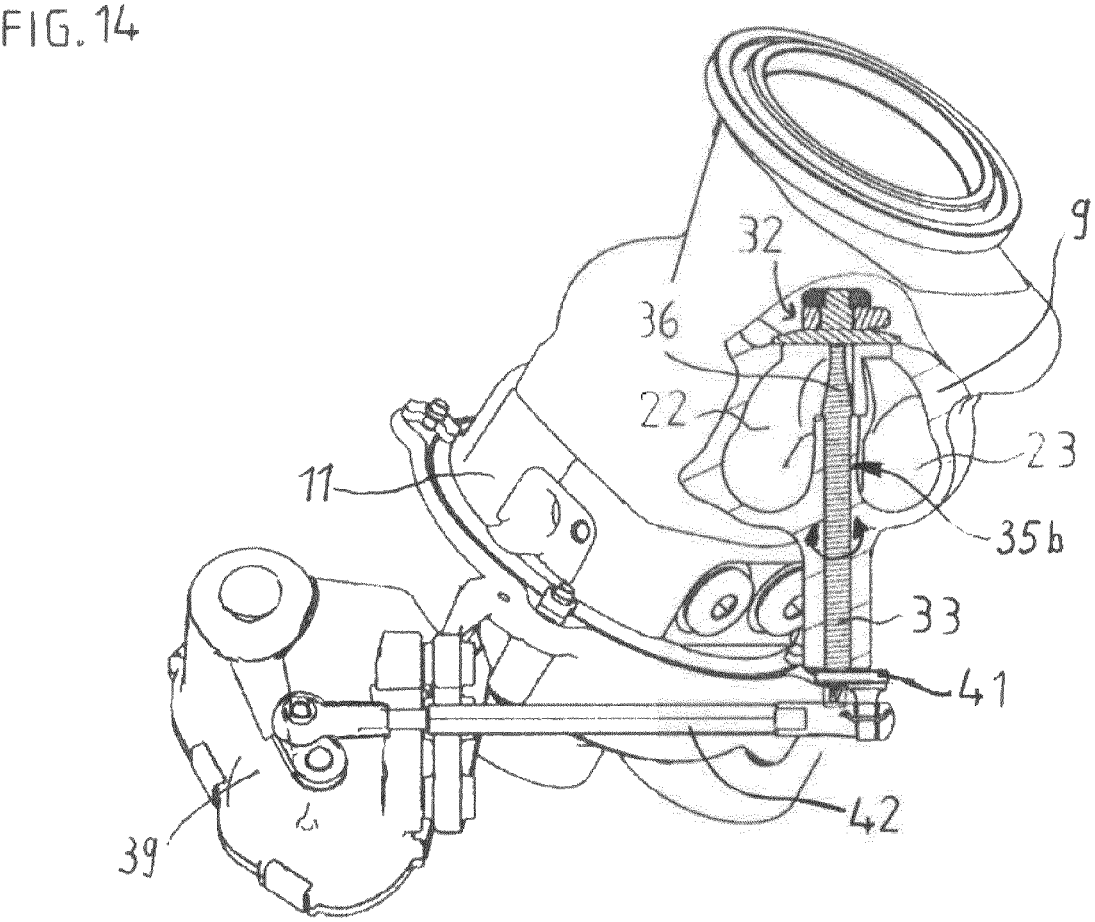
FIG. 14 shows an illustration of a turbocharger with a partial section in the region of the wastegate valve for the purposes of explaining an exemplary embodiment for an arrangement of a valve element, designed as a rotary flap, as per FIGS. 12 and 13.

FIG. 14 shows an illustration of a turbocharger with a partial section in the region of the wastegate valve 32 for the purposes of explaining an exemplary embodiment for an arrangement of a valve element 35, designed as a rotary flap 35b, as per FIGS. 12 and 13. The actuation of the rotary flap 35b illustrated in FIGS. 12 and 13, which includes the displacement shaft 33 and the closing body 36, may be performed using an actuator fastened to the compressor housing 11, said actuator being designed for example as a rotary actuator 39, which is connected to a coupling rod 42. Said coupling rod 42 converts the rotational actuating movement of the rotary actuator 39 into a likewise rotational actuating movement of the rotary crank 41 arranged on the displacement shaft. This rotational displacement of the displacement shaft 33 also gives rise—as has been discussed above on the basis of FIGS. 12 and 13—to an opening and closing of the volute connection by means of the closing body 36, which is connected to or formed in one piece with the displacement shaft 33, of the rotary flap 35b, by opening-up or shutting-off of the passage recess 21b in the separating wall 21 within the turbine housing 9.

Figure 15:
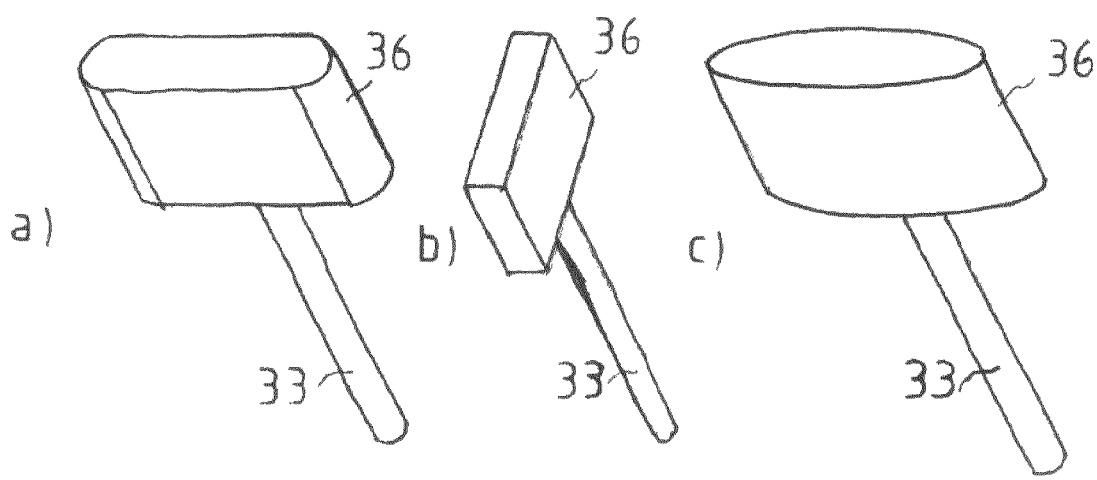
FIG. 15 shows perspective illustrations for illustrating various possible embodiments of the rotary flap shown in FIGS. 12 and 13.

FIG. 15 shows perspective illustrations for illustrating various possible embodiments of the rotary flap 35b illustrated in FIGS. 12 and 13.

Said rotary flaps each have a displacement shaft 33 and a closing body 36. FIG. 15a shows a rotary flap, the closing body 36 of which is of cuboidal design and the lateral end regions of which are rounded. FIG. 15b shows a rotary flap, the closing body 36 of which is of cuboidal design. FIG. 15c finally shows a rotary flap, the closing body 36 of which has an oval cross-sectional area.

The invention claimed is:

1. A turbine for an exhaust-gas turbocharger, the turbine comprising:
    a turbine housing having two exhaust-gas volutes for an exhaust gas flow, a separating wall between said two exhaust-gas volutes, a common wastegate opening, and a flap disk of a wastegate valve for selectively closing and opening said wastegate opening;
    a valve element configured for controlling a volute connection between said two exhaust-gas volutes, said valve element having a displacement shaft and a closing body connected to said displacement shaft;
    said displacement shaft extending through a bore formed in a separating wall plane of said separating wall between said two volutes; and
    said closing body being arranged in the volute connection of said separating wall in order to selectively open and close the volute connection, and said volute connection being formed as a passage recess, which is formed in said separating wall in a region of said wastegate opening and runs transversely with respect to said separating wall plane.

2. The turbine according to claim 1, wherein said flap disk of the wastegate valve is pivotable, as a flap-pivot arm valve, by way of a pivot arm with a wastegate spindle into an open or a closed position, or wherein said flap disk of the wastegate valve is axially displaceable, as a flap-shaft valve, by way of a valve shaft into the open or the closed position.

3. The turbine according to claim 1, wherein said valve element is a linear slide which has said closing body connected to said displacement shaft, and wherein said closing body is displaceable together with said displacement shaft in an axial direction of said displacement shaft in order to selectively open and close the volute connection of said separating wall.

4. The turbine according to claim 3, wherein said separating wall is formed, in a region of said passage recess, with a groove-shaped or a pocket-shaped closing body recess which runs in a direction of said displacement shaft and into which said closing body can be retracted in an axial direction in order to open said volute connection.

5. The turbine according to claim 3, wherein said displacement shaft carries a stop element at an end thereof averted from said closing body, said stop element limiting an axial movement of said linear slide during a closing of said volute connection.

6. The turbine according to claim 5, wherein, with said wastegate valve fully closed and said volute connection fully closed, an end region of said closing body which is averted from said displacement shaft is spaced apart from said flap disk of said wastegate valve by a gap defined by said stop element.

7. The turbine according to claim 3, wherein, with said wastegate valve fully closed and said volute connection fully closed, an end region of said closing body which is averted from said displacement shaft bears sealingly against said flap disk of said wastegate valve.

8. The turbine according to claim 1, wherein said valve element is a rotary flap which has said closing body connected to said displacement shaft, wherein said closing body is rotatable together with said displacement shaft about a displacement shaft longitudinal axis in order to open and close said volute connection of said separating wall.

9. The turbine according to claim 8, wherein, with said wastegate valve closed, an end region of said closing body of said rotary flap that is averted from said displacement shaft bears against said flap disk of said wastegate valve, or is spaced apart therefrom by a defined gap, both in a closed and in an open state of said volute connection.

* * * * *